(12) United States Patent
Kessel et al.

(10) Patent No.: US 10,389,809 B2
(45) Date of Patent: Aug. 20, 2019

(54) SYSTEMS AND METHODS FOR RESOURCE MANAGEMENT IN A NETWORKED ENVIRONMENT

(71) Applicant: NETAPP, INC., Sunnyvale, CA (US)

(72) Inventors: Omri Kessel, Newton, MA (US); Keren Dagan, Lexington, MA (US); Michael Edward Stapp, Westford, MA (US); Aashay Yogesh Joshi, Nashua, NH (US); Daniel Nuriyev, Sharon, MA (US); John Jason Sprague, Westford, MA (US)

(73) Assignee: NETAPP, INC., Sunnyvale, CA (US)

( * ) Notice: Subject to any disclaimer, the term of this patent is extended or adjusted under 35 U.S.C. 154(b) by 351 days.

(21) Appl. No.: 15/056,058

(22) Filed: Feb. 29, 2016

(65) Prior Publication Data

US 2017/0250919 A1    Aug. 31, 2017

(51) Int. Cl.
| | | |
|---|---|---|
| *G06F 9/00* | (2006.01) | |
| *G06F 17/30* | (2006.01) | |
| *G06F 9/46* | (2006.01) | |
| *H04L 29/08* | (2006.01) | |
| *H04L 29/06* | (2006.01) | |

(52) U.S. Cl.
CPC .......... *H04L 67/1097* (2013.01); *H04L 63/00* (2013.01); *H04L 63/1425* (2013.01); *H04L 63/20* (2013.01)

(58) Field of Classification Search
CPC . H04L 67/1097; H04L 63/00; H04L 63/1425; H04L 63/20

USPC ........................................................ 709/226
See application file for complete search history.

(56) References Cited

U.S. PATENT DOCUMENTS

| | | | | |
|---|---|---|---|---|
| 8,069,481 | B2* | 11/2011 | Judge | G06F 21/554 |
| | | | | 709/224 |
| 8,127,273 | B2* | 2/2012 | Barsness | G06F 9/5027 |
| | | | | 709/201 |
| 9,391,828 | B1* | 7/2016 | Dubrovsky | H04L 29/08072 |
| 9,619,389 | B1* | 4/2017 | Roug | G06F 12/0835 |
| 9,804,929 | B2* | 10/2017 | Karinta | G06F 16/172 |
| 2002/0194251 | A1* | 12/2002 | Richter | G06F 9/5011 |
| | | | | 718/105 |
| 2008/0059474 | A1* | 3/2008 | Lim | G06F 21/604 |
| 2009/0235269 | A1* | 9/2009 | Nakajima | G06F 3/061 |
| | | | | 718/104 |
| 2014/0149794 | A1* | 5/2014 | Shetty | H04L 67/1095 |
| | | | | 714/20 |

(Continued)

*Primary Examiner* — Kevin T Bates
*Assistant Examiner* — Golam Mahmud
(74) *Attorney, Agent, or Firm* — Klein, O'Neill & Singh, LLP

(57) ABSTRACT

Methods and systems for a networked storage environment are provided. An application executed by a computing device using a plurality of resources in a networked storage environment for storing and retrieving application data is identified. Performance data of the plurality of resources is collected and historical performance data is retrieved. The collected and historical performance data for the plurality of resources is used to determine an overall anomaly score for the application indicating behavior of the application over time and individual anomaly scores for each resource with an indicator highlighting behavior of a resource that impacts the overall anomaly score for the application.

20 Claims, 17 Drawing Sheets

(56) References Cited

U.S. PATENT DOCUMENTS

| | | | |
|---|---|---|---|
| 2015/0033084 A1* | 1/2015 | Sasturkar | G06F 11/0709 |
| | | | 714/46 |
| 2016/0140151 A1* | 5/2016 | Brew | H04L 63/1425 |
| | | | 707/690 |
| 2016/0188898 A1* | 6/2016 | Karinta | G06F 16/172 |
| | | | 726/4 |
| 2016/0218942 A1* | 7/2016 | Choquette | H04L 43/0811 |
| 2017/0063905 A1* | 3/2017 | Muddu | G06F 16/254 |
| 2017/0302531 A1* | 10/2017 | Maes | H04L 63/1416 |

* cited by examiner

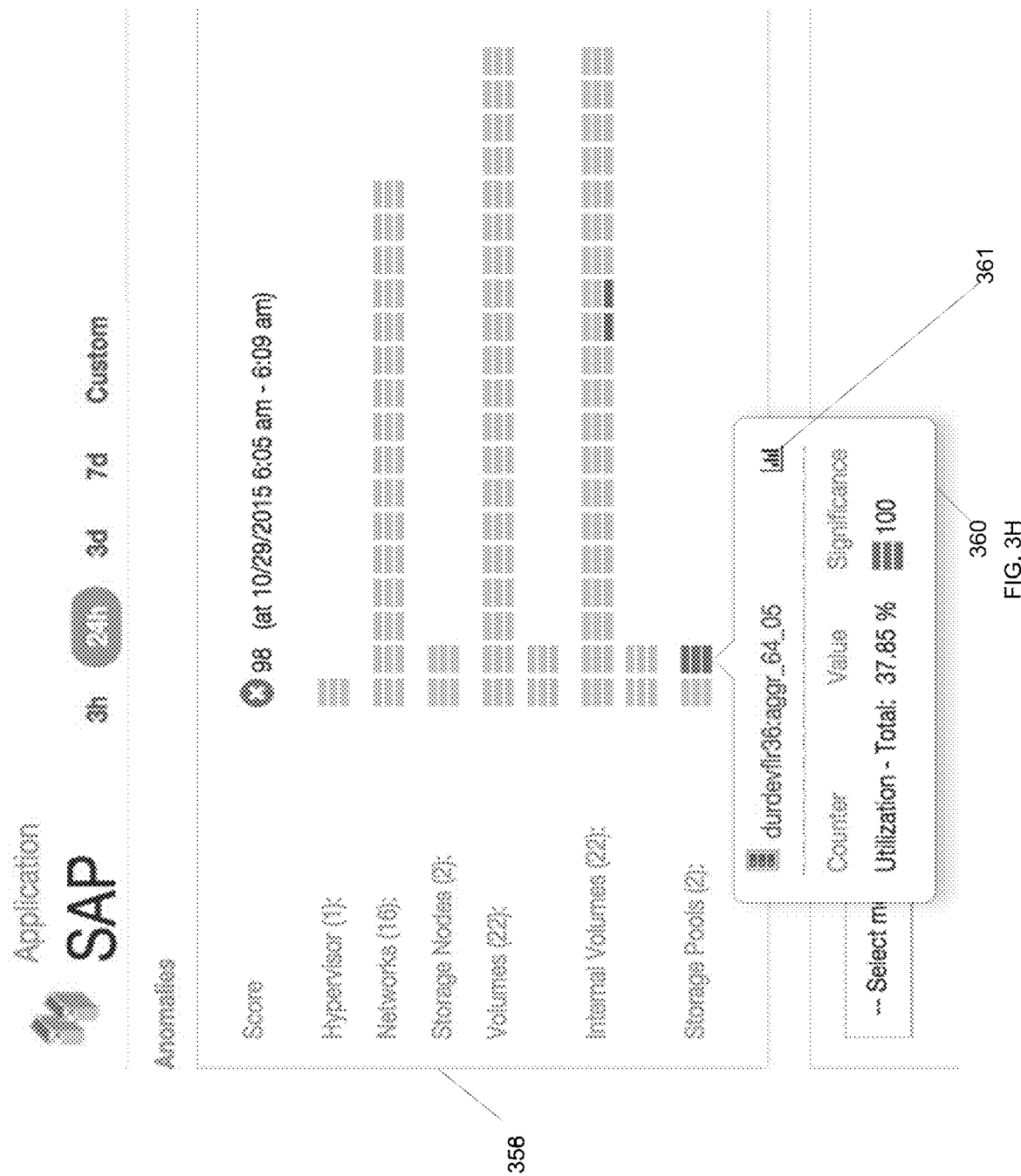

SYSTEMS AND METHODS FOR RESOURCE MANAGEMENT IN A NETWORKED ENVIRONMENT

TECHNICAL FIELD

The present disclosure relates to networked storage environments and more particularly, to managing resources used by an application in networked storage environments.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

Networked storage systems are used extensively in NAS, SAN and virtual environments. The infrastructure for such storage systems uses various components/resources, for example, switches, storage devices and others. Continuous efforts are being made to efficiently manage the resources that are used in networked storage systems.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures:

FIGS. 3C-3I show examples of using the processes of FIGS. 3A-3B, according to one aspect of the present disclosure;

DETAILED DESCRIPTION

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

In one aspect, methods and systems for a networked storage environment are provided. An application executed by a computing device using a plurality of resources in the networked storage environment for storing and retrieving application data is identified. Performance data of the plurality of resources is collected and historical performance data of the resources is also retrieved. The collected and historical performance data for the plurality of resources is used to determine an overall anomaly score for the application indicating behavior of the application over time and individual anomaly scores for each resource with an indicator highlighting the behavior of each resource that impacts the overall anomaly score of the application.

Figure 1A:
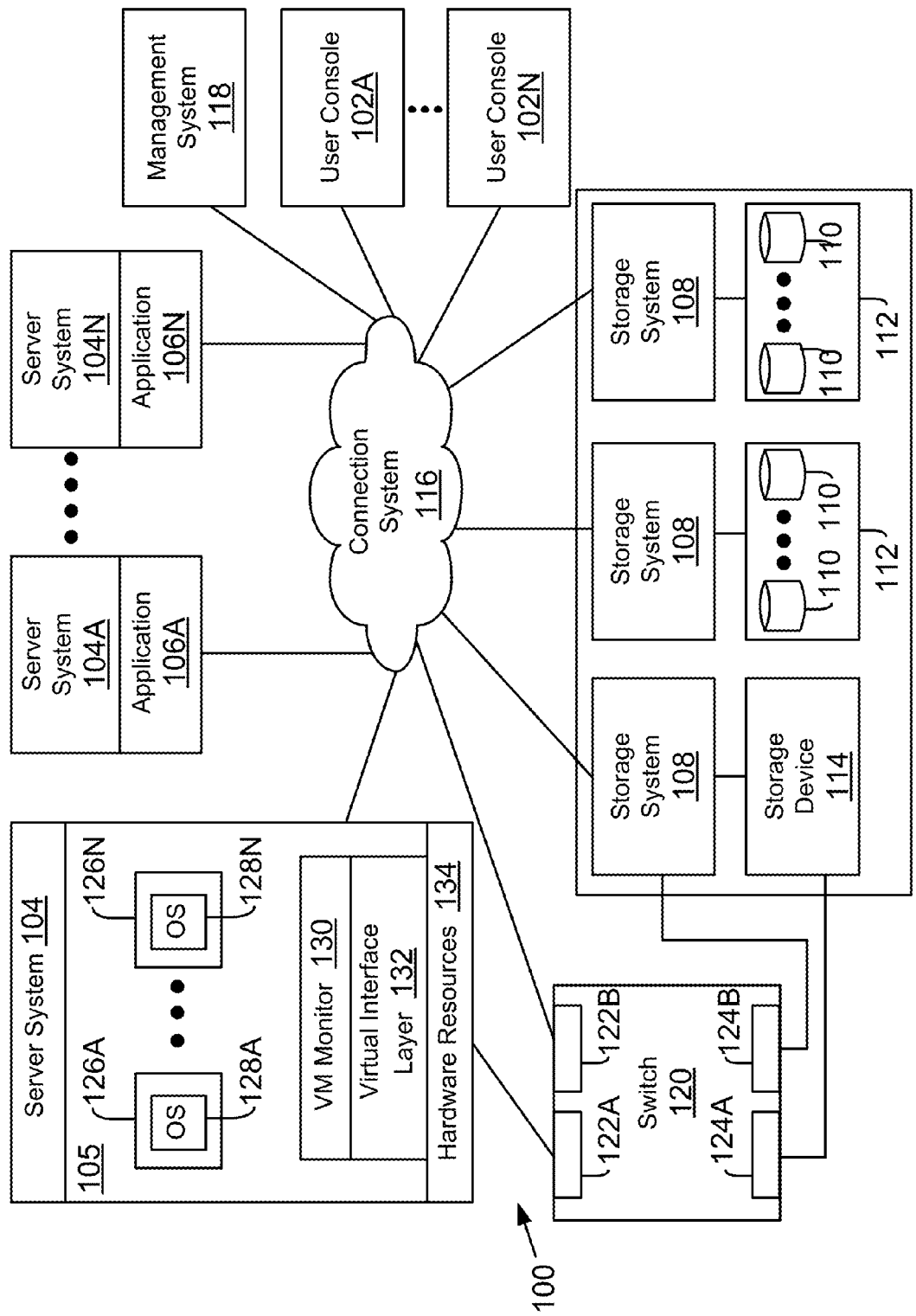
FIG. 1A shows an example of an operating environment for the various aspects disclosed herein.

System 100:

FIG. 1A shows an example of a networked operating environment 100 (also referred to as system 100), for implementing the various adaptive aspects of the present disclosure. In one aspect, system 100 may include a plurality of computing systems 104A-104N (may also be referred to and shown as server system 104 or as host system 104) that may access one or more storage systems 108 via a connection system 116 such as a local area network (LAN), wide area network (WAN), the Internet and others. The server systems 104 may communicate with each other via connection system 116, for example, for working collectively to provide data-access service to user consoles 102A-102N (may be referred to as user 102).

In one aspect, in a SAN environment, one or more switch 120 may be used for communication between server systems 104 and storage device(s) 114. The switch may include a plurality of ports 122A/122B and 124A/124B, having logic and circuitry for handling network packets. Port 122A is coupled to server system 104, port 122B is coupled to the network 116, while ports 124A/124B may be coupled to storage server 108 and storage device 114, respectively.

Server systems 104 may be computing devices configured to execute applications 106A-106N (referred to as application 106 or applications 106) over a variety of operating systems, including the UNIX® and Microsoft Windows® operating systems. Applications 106 may utilize data services of storage system 108 to access, store, and manage data in a set of storage devices 110/114 that are described below in detail. Applications 106 may include an email exchange application, a database application or any other type of application. In another aspect, application 106 may comprise a virtual machine as described below in more detail.

Applications 106 utilize various resources, for example, host computing resources, network interface cards, storage nodes, storage devices and others. In one aspect, systems and methods described below are provided to track the overall infrastructure used by the applications as well as monitor individual resource behavior. Analysis tools are provided to view the overall and individual resources so that users are able to monitor infrastructure behavior and correct behavior that may be categorized as an anomaly for an application specific environment.

Server systems 104 generally utilize file-based access protocols when accessing information (in the form of files and directories) over a network attached storage (NAS)-based network. Alternatively, server systems 104 may use block-based access protocols, for example, the Small Computer Systems Interface (SCSI) protocol encapsulated over TCP (iSCSI) and SCSI encapsulated over Fibre Channel (FCP) to access storage via a storage area network (SAN).

Server 104 may also execute a virtual machine environment 105, according to one aspect. In the virtual machine environment 105 a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

The virtual execution environment 105 executes a plurality of VMs 126A-126N. VMs 126A-126A execute a plurality of guest OS 128A-128N (may also be referred to as guest OS 128) that share hardware resources 134. As described above, hardware resources 134 may include CPU, memory, I/O devices, storage or any other hardware resource.

A virtual machine monitor (VMM) 130, for example, a processor executed hypervisor layer provided by VMWare Inc., Hyper-V layer provided by Microsoft Corporation (without derogation of any third party trademark rights) or any other layer type, presents and manages the plurality of guest OS 128a-128n. VMM 130 may include or interface with a virtualization layer (VIL) 132 that provides one or more virtualized hardware resource 134 to each guest OS. For example, VIL 132 presents physical storage at storage devices 110/114 as virtual storage (for example, as a virtual hard drive (VHD)) to VMs 126A-126N. The VMs use the VHDs to store information at storage devices 110 and 114.

In one aspect, VMM 130 is executed by server system 104 with VMs 126A-126N. In another aspect, VMM 130 may be executed by an independent stand-alone computing system, often referred to as a hypervisor server or VMM server and VMs 126A-126N are presented via another computing system. It is noteworthy that various vendors provide virtualization environments, for example, VMware Corporation, Microsoft Corporation (without derogation of any third party trademark rights) and others. The generic virtualization environment described above with respect to FIG. 1A may be customized depending on the virtual environment provider.

System 100 may also include a management system 118 for managing and configuring various elements of system 100. Management system 118 may include one or more computing systems for performing various tasks described below in detail. Details regarding management system 118 are provided below in more detail.

System 100 may also include one or more user consoles 102A-102N referred to as users. Users' 102A-102N may access server system 104 for storage related services provided by storage system 108 and also use management system 118 for obtaining management related services described below in detail.

In one aspect, storage system 108 has access to a set of mass storage devices 110 (may be referred to as storage devices 110) within a storage subsystem 112. Storage system 108 may also access storage devices 114 via switch 120 that may be a Fibre Channel, Fibre Channel over Ethernet or any other type of switch. Storage devices 110 and 114 are referenced interchangeably throughout this specification. As an example, storage devices 110 and 114 may be a part of a storage array within the storage sub-system.

Storage devices 110 are used by storage system 108 for storing information. The storage devices 110 may include writable storage device media such as magnetic disks, video tape, optical, DVD, magnetic tape, non-volatile memory devices for example, self-encrypting drives, flash memory devices and any other similar media adapted to store information. The storage devices 110/114 may be organized as one or more groups of Redundant Array of Independent (or Inexpensive) Disks (RAID). The aspects disclosed herein are not limited to any particular storage device or storage device configuration.

In one aspect, to facilitate access to storage devices 110/114, a storage operating system of storage system 108 "virtualizes" the storage space provided by storage devices 110/114. The storage system 108 can present or export data stored at storage devices 110/114 to server systems 104 and VMM 130 as a storage volume or one or more qtree sub-volume units. Each storage volume may be configured to store data files (or data containers or data objects), scripts, word processing documents, executable programs, and any other type of structured or unstructured data. From the perspective of the VMS/server systems, each volume can appear to be a single disk drive. However, each volume can represent the storage space in one disk, an aggregate of some or all of the storage space in multiple disks, a RAID group, or any other suitable set of storage space.

It is noteworthy that the term "disk" as used herein is intended to mean any storage device/space and not to limit the adaptive aspects to any particular type of storage device, for example, hard disks.

The storage system 108 may be used to store and manage information at storage devices 114/114 based on a request generated by server system 104, management system 118, user 102 and/or a VM. The request may be based on file-based access protocols, for example, the CIFS or the NFS protocol, over TCP/IP. Alternatively, the request may use block-based access protocols, for example, iSCSI or FCP.

As an example, in a typical mode of operation, server system 104 (or VMs 126A-126N) transmits one or more input/output (I/O) commands, such as an NFS or CIFS request, over connection system 116 to the storage system 108. Storage system 108 receives the request, issues one or more I/O commands to storage devices 110/114 to read or write the data on behalf of the server system 104, and issues an NFS or CIFS response containing the requested data over the connection system 116 to the respective server system 104

In one aspect, storage system 108 may have a distributed architecture, for example, a cluster based system that may include a separate network module and storage module, described below in detail with respect to FIG. 2A. Briefly, the network module is used to communicate with host platform server system 104 and management system 118, while the storage module is used to communicate with the storage devices 110 that are a part of a storage sub-system.

Storage system 108 maintains various data structures for storing information related to storage devices 110/114. For example, storage system 108 is aware of the identity and capabilities of storage device 110/114. Storage system 108 maintains the information regarding all the VMs and server systems that use storage device 110/114. This information may be stored as unique identifiers.

Because storage system 108 services read and write requests, it maintains information regarding the number of I/O operations that are processed within a time unit, for example, a second, referred to herein as "IOPS" by the storage device and by each storage volume. Storage system 108 is also aware of the identity of the server systems that generate the I/O requests. Storage system 108 also maintains information on a rate at which information is transferred (also referred to as a throughput rate) from the storage devices. The throughput rate is maintained for each storage volume of the storages devices.

Figure 1B:
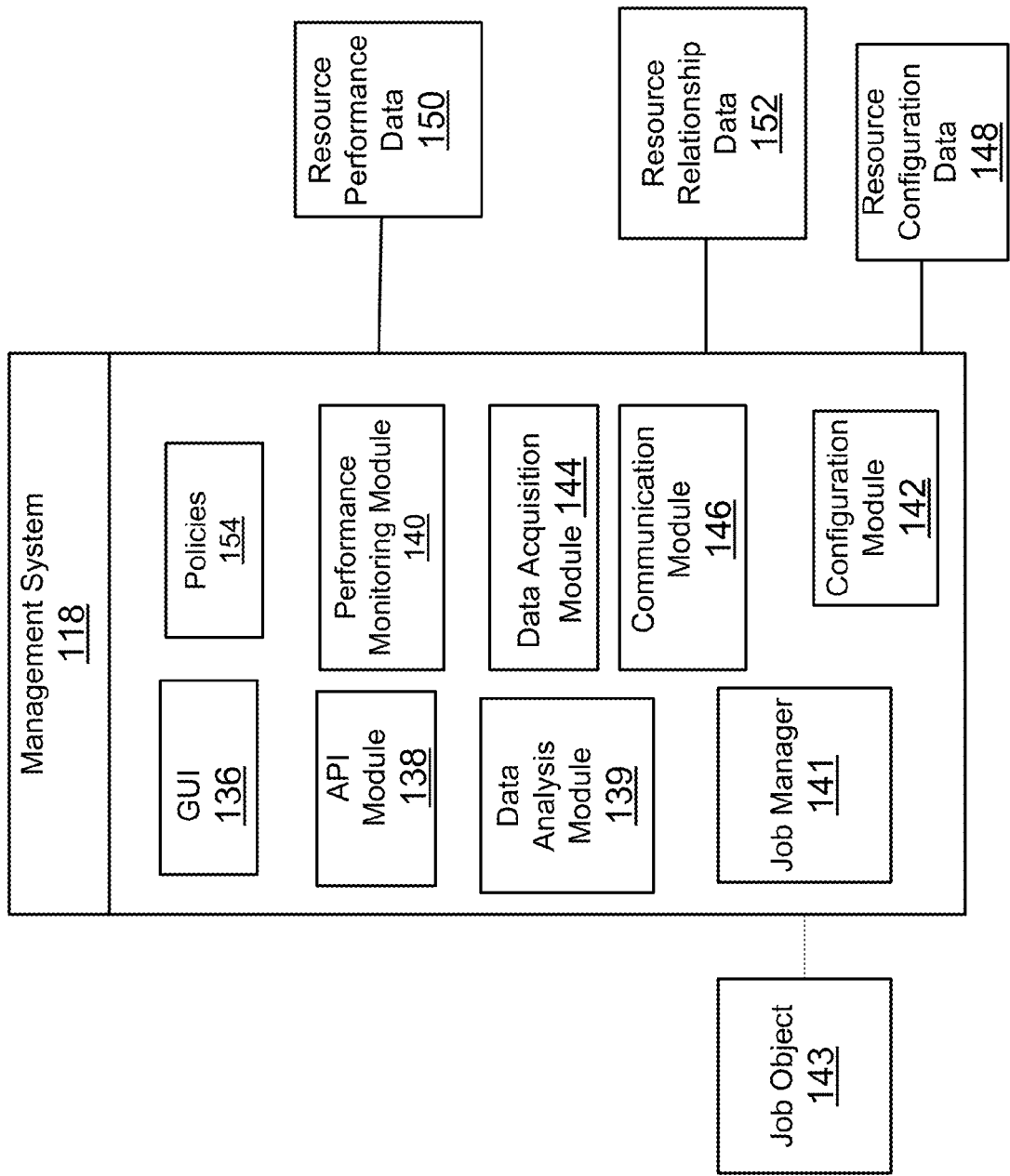
FIG. 1B shows an example of a management system, according to one aspect of the present disclosure.

Management System 118:

FIG. 1B shows a block diagram of management system 118, according to one aspect of the present disclosure. The various modules of management system 118 may be implemented in one computing system or in a distributed environment among multiple computing systems.

In the illustrated aspect, the management system 118 may include a graphical user interface (GUI) module 136 to generate a GUI for use by a storage administrator or a user using a user console 102. In another aspect, management system 118 may present a command line interface (CLI) to a user. The GUI may be used to receive a request to configure a job for monitoring the infrastructure used by an application. The user request is provided to an application programming interface (API) module 138 that may be implemented as one or more REST APIs, where REST means "Representational State Transfer". REST is a scalable system used for building web services. REST systems/interface may use HTTP (hyper-text transfer protocol) or other communication protocols. The various aspects disclosed herein are not limited to any specific API format.

The configured application information is provided to a job manager 141 that creates a job object 143. The job object 143 identifies the application, the various resources that are associated with the application, counters that are used to track the performance data for the various resources, and one or more filters that are used to filter out performance data in tracking the application based infrastructure, as described below in more detail.

Management system 118 may include a communication module 146 that implements one or more conventional network communication protocols and/or APIs to enable the various modules of management system 118 to communicate with the storage system 108, VMs 126A-126N, server system 104 and clients 102.

In one aspect, management system 118 includes a data acquisition module 144 that obtains information regarding storage devices 110/114 from storage system 108, the various host systems, and other components of system 100. Acquisition module 144 may send a discovery request to obtain configuration information. The format and structure of the discovery request will depend on the protocol/standard used by acquisition module 144 to communicate with the server systems 104, storage system 108, storage device sub-systems 112 and other resources.

In one aspect, the acquisition module 144 collects configuration data and performance data regarding various resources based on defined policies 154, as described below in detail. The configuration data identifies the resource, resource type, connection information, attributes that define the relationship between one resource and another (for example, a volume uses a storage device space, then the configuration information includes information regarding both resources). The nature of the configuration information will depend on the resource type and the function that the resource provides.

The performance data 150 may include an amount of data that is transferred to and from a storage device within a certain duration (throughput), a number of IOPS that are serviced by a storage device, the identity of the server systems (also referred to as host systems) that use the storage devices, transfer rates of network interface card (NIC) ports and other information. The performance data 150 is based on a performance metric defined for the resource. The performance metric depends on the resource type. For example, the metric for a NIC port may be the network connection speed, delay in transmitting data while that for a storage device may be utilization and delay in completing read/write operations.

Management system 118 also includes a processor executable configuration module 142 that stores configuration information for various resources used by system 100, for example, storage system nodes, storage devices, NIC ports and other resources. The configuration information may be stored as data structure 148 described below in detail.

As an example, management system 118 maintains resource configuration data structure 148 to store a name of a storage device manufacturer, a storage device identifier, a maximum number of IOPS that the device can handle and a throughput rate that the storage device is able to support. Relationship data may be stored at data structure 152. In another aspect, data structure 148 and 152 may be integrated.

Resource configuration data 148 also identifies the storage system 108 that manages a storage device, the storage volumes associated with the storage device and the identity of users (for example, server systems 104) that access the storage volumes. This information may be obtained from storage system 108.

Resource configuration data 148, may also identify a NIC used by system 100 (not shown), the various ports of the NIC and the identity of the devices/computing systems that are coupled to the switch. This information is acquired by acquisition module 144 either directly from the resources or any other entity, according to one aspect.

Resource configuration data 148 may also identify the VMM 130, for example, the hypervisor that presents and controls VMs 126A-126N; the various VMs and the resources that are used by the VMs at any given time, for example, VHDs. This information may also be acquired by acquisition module 144 from VMM 130 and storage system 108.

The resource relationship data 152 stores information regarding various resources. The relationship data 152 may be populated when a networked storage environment is initialized and updated as components are added or removed.

Management system 118 includes a performance monitoring module (may be referred to as performance module) 140 that receives performance data regarding the various resources of system 100. The resource performance data may be stored at data structure 150. The performance data 150 shows if a storage device is over utilized at a given time, the number of IOPS within certain duration, a throughput within the certain duration, available capacity at any given time and other information. Performance data 150 may also include information regarding the performance of NIC ports, Node CPUs and any other configured resource. The performance data 150 may also store information indicating current utilization and available performance capacity of the resource at any given time. Performance data 150 may also include information regarding the various VMs, identity of the virtual disks used by the VMs and other information.

Management system 118 may also include other modules that are not described in detail because the details are not germane to the inventive aspects.

Figure 1C:
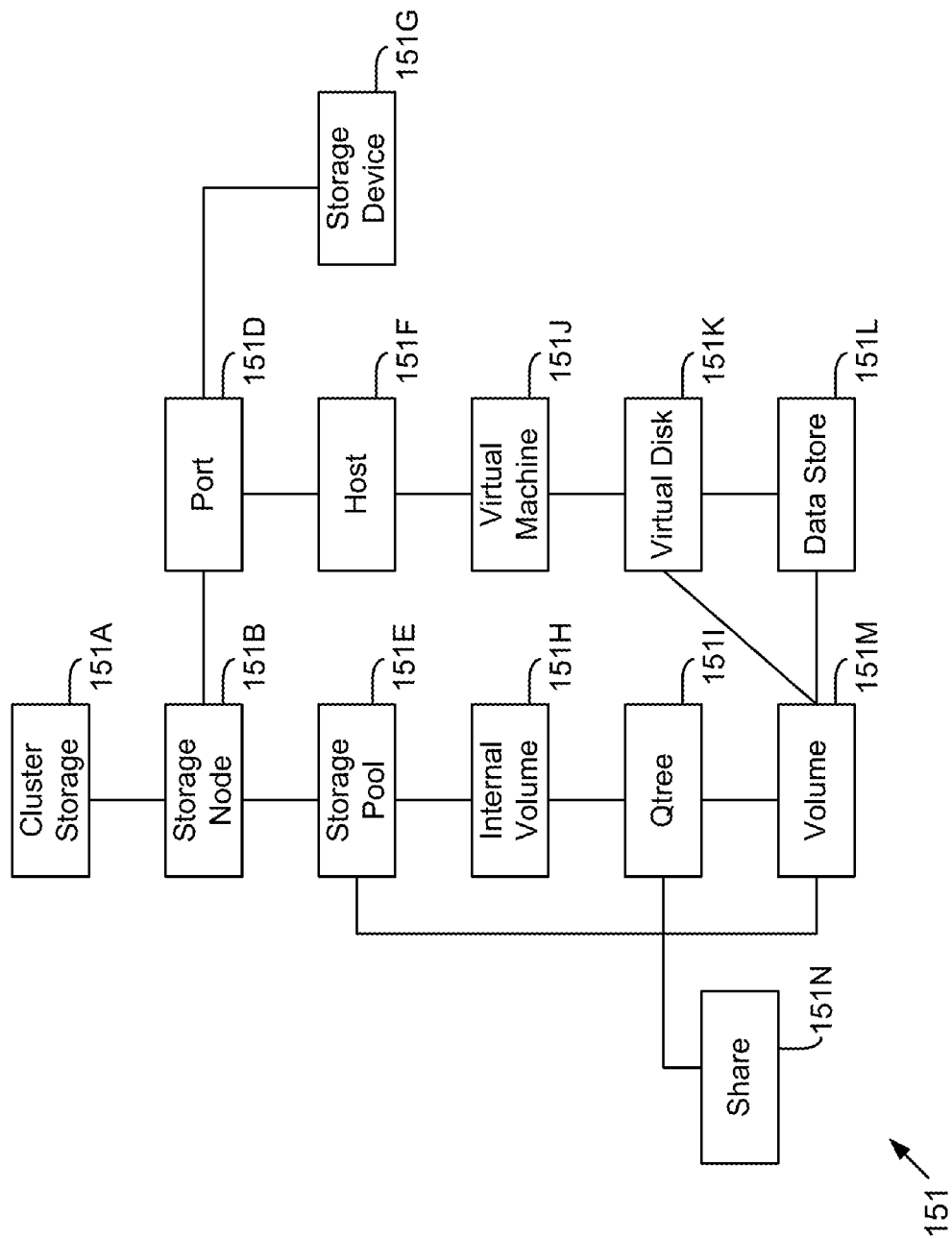
FIG. 1C shows a layout for managing resource objects by the management system of FIG. 1B.

Object Hierarchy:

FIG. 1C shows an example of a format 151 for tracking information/relationships regarding different resources that are used within storage system 100 and a clustered storage system shown in FIG. 2A and described below in detail. Each resource is represented as an object and is identified by a unique identifier value.

Format 151 maybe a hierarchical mesh where various objects may have parent-child, peer and remote peer relationships, as described below. As an example, format 151 shows a cluster object 151A that may be categorized as a root object type for tracking cluster level resources. The cluster object 151A is associated with various child objects, for example, a storage node object 152B that identifies a storage node within the cluster. The cluster object 151A stores information regarding the cluster, for example, the number of nodes it may have, information identifying the nodes; and any other information.

The storage node object 151B stores information regarding a node, for example, a node identifier and performance data regarding the nodes, for example, CPU utilization of the nodes, latency (i.e. delay) in processing I/O requests, the number of storage volumes the node is managing, and other information.

Each cluster node object 151B may be associated with other objects for example, a storage pool 151E and a port object 151D. The port object 151D is also associated with a storage device object 151G denoting that the port provides access to the storage device.

The storage pool 151E object stores an identifier for identifying a storage pool that may have one or more aggregates associated with one or more physical storage devices. The storage pool object 151E stores information regarding storage utilization, latency in responding to I/O requests and other information by one or more storage pools.

The storage pool 151E is associated with an internal volume object 151H that is managed by the storage operating system. The internal volume is associated with a Qtree object 151I that in turn is associated with a volume (for example, a LUN) 151M that is presented to a host system or a share (for example, a CIFS share) 151N that is presented to a host system. The volume 151M may be associated with a data store 151L.

A host system object 151F is used to store information regarding a host and a virtual machine 151J tracks performance/configuration information regarding a virtual machine. The virtual disk object 151K is used to track information regarding a virtual disk. The virtual disk object 151K is also associated with the data store object 151L.

The various objects of FIG. 1C are shown as an example. Other object types may be added based on an operating environment. The performance data and the configuration data including the relationship information between the resources is stored at a storage device, as described below in detail.

Figure 1D:
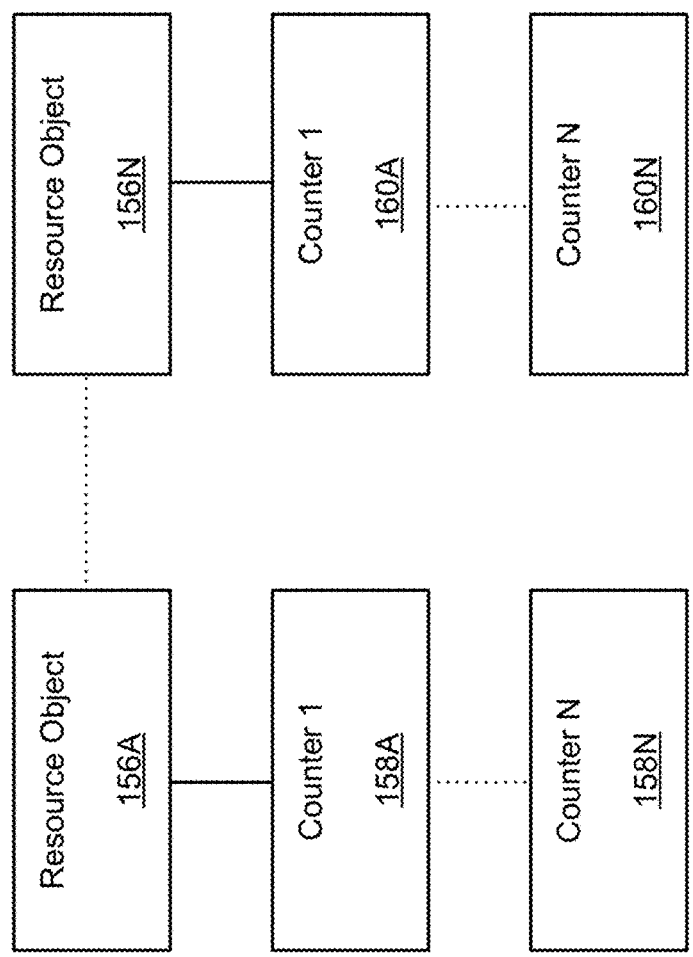
FIG. 1D shows an example of a plurality of resource objects that are managed by the management system of FIG. 1B, according to one aspect of the present disclosure.

FIG. 1D shows an example of how performance data is maintained and collected for various resources, according to one aspect. As an example, there are may be two types of resources, a service center and a delay center resource. The service center is a resource category that can be represented by a queue with a wait time and a service time (for example, a processor that processes a request out of a queue). The delay center may be a logical representation for a control point where a request stalls waiting for a certain event to occur and hence the delay center represents the delay in request processing. The delay center may be represented by a queue that does not include service time and instead only represents wait time. The distinction between the two resource types is that for a service center, performance data includes a number of visits, wait time per visit and service time per visit. For the delay center, only the number of visits and the wait time per visit at the delay center.

In one aspect, a flow type i.e. a logical view of the resources is used for handling client requests. The flow types include two categories, latency and utilization. A latency flow type is used for analyzing how long operations take at the service and delay centers. The latency flow type is used to identify a workload whose latency has increased beyond a certain level. A typical latency flow may involve writing data to a storage device based on a client request and there is latency involved in writing the data at the storage device. The utilization flow type is used to understand resource consumption of workloads and may be used to identify resource contention.

The various resources of system 100 are represented logically as resource objects 156A-156N (maybe referred to as objects 156). Data associated with the resources is collected using counters shown as 158A-158N and 160A-160N and then stored at performance data structure 150 (FIG. 1B).

Figure 1E:
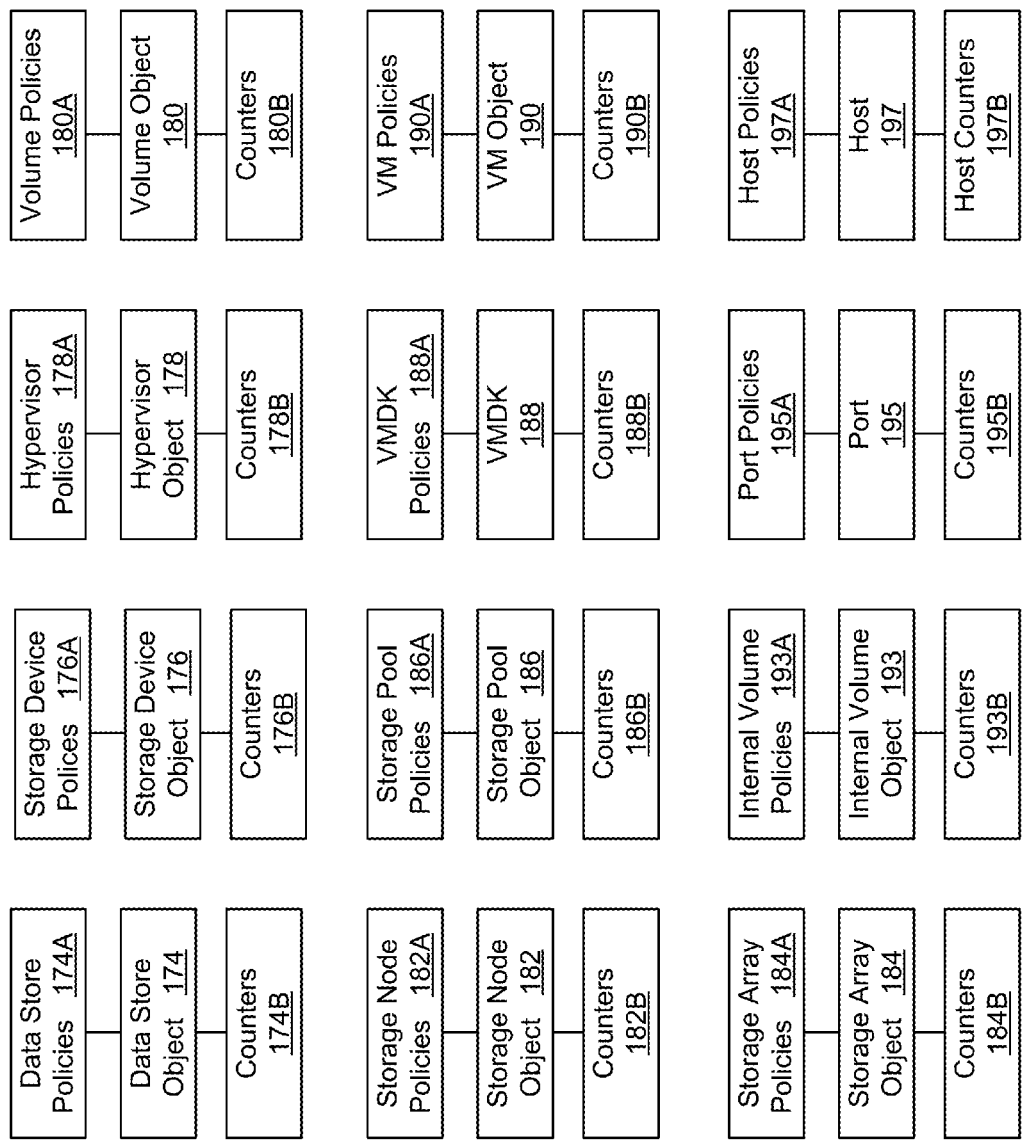
FIG. 1E shows an example of a plurality of objects representing various resources managed according to one aspect of the present disclosure.

FIG. 1E shows an example of various resource objects, similar to FIG. 1C, according to one aspect. For example, resource objects include a data store object 174 with associated data store policies 174A and counters 174B. The data store object 174 is used to track a plurality of virtual disks (VMDKs) that may be used within a VM for storing information.

Resource objects may include a storage device object 176 with storage device policies 176A and counters 176B. The storage device object 176 is used for tracking attributes of different storage devices using counters 176B.

Resource objects may include a hypervisor (or VMM) object 178) object with policies 178A and counters 178B. The hypervisor object 178 is used for tracking attributes of the hypervisor using counters 178B.

Resource objects may include a volume object 180 with policies 180A and counters 180B. The volume object 180 is used for tracking attributes of a volume using counters 180B. The volume object 180 represents a volume that is presented to a host system for storing data.

Resource objects include a storage node object 182 with policies 182A and counters 182B. The storage node object 182 is used for tracking attributes of a storage node using counters 182B, for example node CPU utilization, available capacity of a Node for handling a new workload and other attributes.

Resource objects include storage object (may also be referred to as storage array object) 184 with policies 184A and counters 184B. The storage object 184 is used for tracking attributes of a storage array using counters 184B including used capacity at any given time, available capacity and other attributes.

Resource objects include a storage pool object 186A with policies 186A and counters 186B. The storage pool object 186 is used for tracking attributes of a storage pool (for example, an aggregate having a plurality of storage devices) using counters 186B.

Resource objects include a virtual disk object (VMDK) 188 with policies 188A and counters 188B. The volume object 188 is used for tracking attributes of a VMDK using counters 188B.

Resource objects include a virtual machine object 190 with policies 190A and counters 190B. The virtual machine object 190 is used for tracking attributes of a VM using counters 190B.

Resource objects include an internal volume object 193 with policies 193A and counters 193B. The internal volume object 193 is used for tracking attributes of an internal volume using counters 193B. An internal volume is a logical representation of storage as maintained by a storage operating system.

Resource objects further includes a switch port object 195 with associated policies 195A and counters 195B. The ports are used to receive and send information.

Resource objects further includes a host system object 197 with associated policies 197A and counters 197B. The host object 197 is used to represent host computing systems, for example, 104.

Figure 2A:
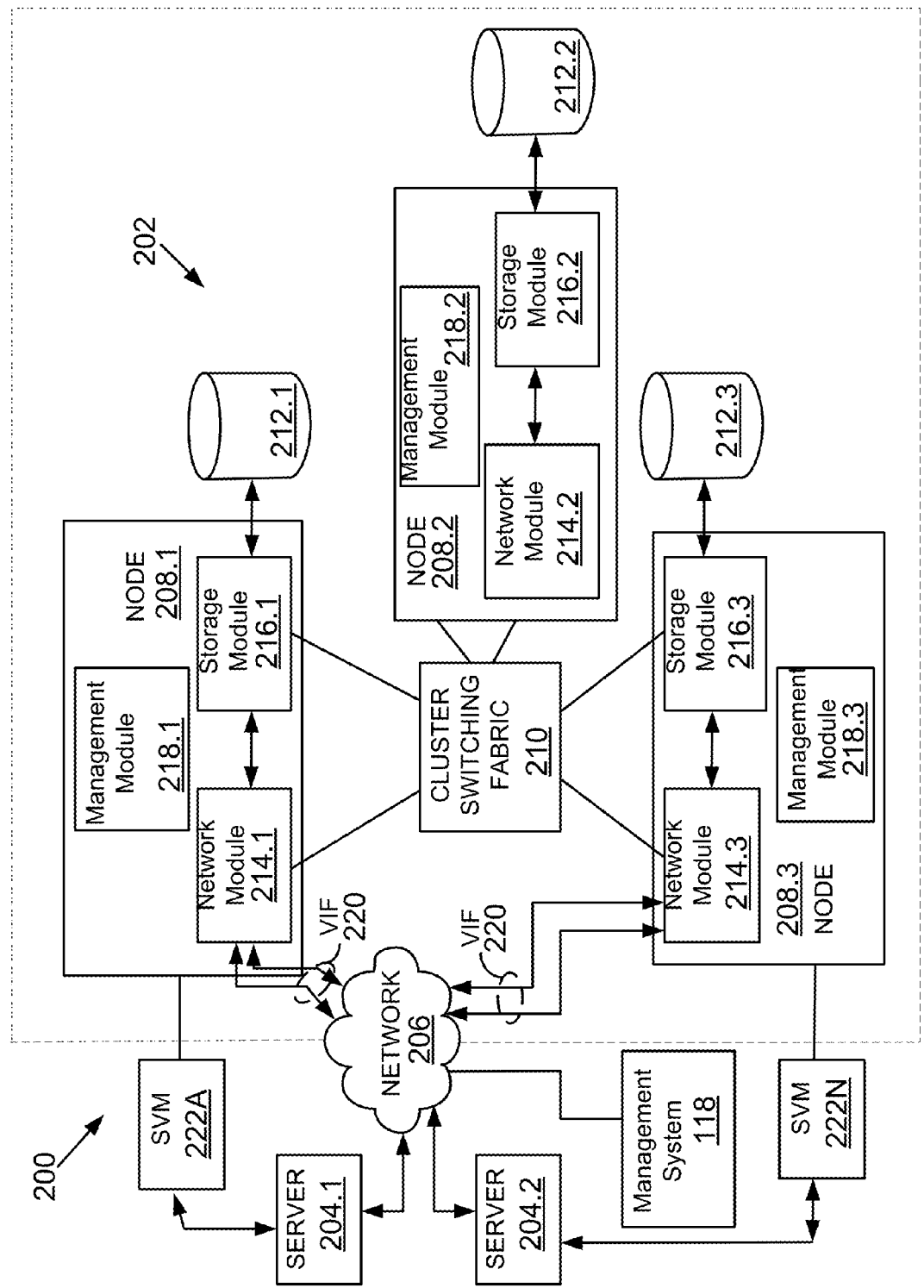
FIG. 2A shows an example of a clustered storage system, according to one aspect of the present disclosure.

Clustered Storage System:

FIG. 2A depicts an illustrative aspect of a storage environment 200 including a plurality of server systems 204.1-204.2 (similar to server systems 104), a clustered storage system 202 and at least one computer network 206 communicably connecting the server systems 204.1-204.2 and the clustered storage system 202. Management system 118 is used to collect information from various cluster nodes as described above in detail.

As shown in FIG. 2A, the clustered storage system 202 includes a plurality of nodes 208.1-208.3, a cluster switching fabric 210, and a plurality of mass storage devices 212.1-212.3 (similar to 110/114, FIG. 1A). Each of the plurality of nodes 208.1-208.3 is configured to include a network module, a storage module, and a management module, each of which can be implemented as a separate processor executable or machine implemented module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enables the respective nodes 208.1-208.3 to connect to one or more of the client systems 204.1-204.2 over the computer network 206, while the storage modules 216.1-216.3 connect to one or more of the storage devices 212.1-212.3.

The management modules 218.1-218.3 provide management functions for the clustered storage system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective network modules 214.1-214.3 and the client systems 204.1-204.2, allowing storage 212.1-212.3 associated with the nodes 208.1-208.3 to be presented to the client systems 204.1-204.2 as a single shared storage pool. For example, the switched virtualization layer may implement a virtual interface architecture. FIG. 2A depicts only the VIFs 220 at the interfaces to the network modules 214.1, 214.3 for clarity of illustration.

The clustered storage system 202 can be organized into any suitable number of virtual servers (VServer or storage virtual machines (SVM)) 222A-222N, in which each virtual storage system represents a single storage system namespace with separate network access. Each virtual storage system has a user domain and a security domain that are separate from the user and security domains of other virtual storage systems. Server systems 204 can access storage space via a VServer from any node of the clustered system 202.

Each of the nodes 208.1-208.3 may be defined as a computer adapted to provide application services to one or more of the client systems 204.1-204.2. In this context, a SVM is an instance of an application service provided to a client system. The nodes 208.1-208.3 are interconnected by the switching fabric 210, which, for example, may be embodied as a Gigabit Ethernet switch or any other switch type.

Although FIG. 2A depicts three network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules.

The server systems 204.1-204.2 of FIG. 2A may be implemented as computing devices configured to interact with the respective nodes 208.1-208.3 in accordance with a client/server model of information delivery. In the presently disclosed aspect, the interaction between the server systems 204.1-204.2 and the nodes 208.1-208.3 enable the provision of network data storage services. Specifically, each server system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The server systems 204.1-204.2 may issue packets according to file-based access protocols, such as the NFS or CIFS protocol, when accessing information in the form of files and directories.

In a typical mode of operation, one of the server systems 204.1-204.2 transmits an NFS or CIFS request for data to one of the nodes 208.1-208.3 within the clustered storage system 202, and the VIF 220 associated with the respective node receives the client request. It is noted that each VIF 220 within the clustered system 202 is a network endpoint having an associated IP address. The server request typically includes a file handle for a data file stored in a specified volume on at storage 212.1-212.3.

Figure 2B:
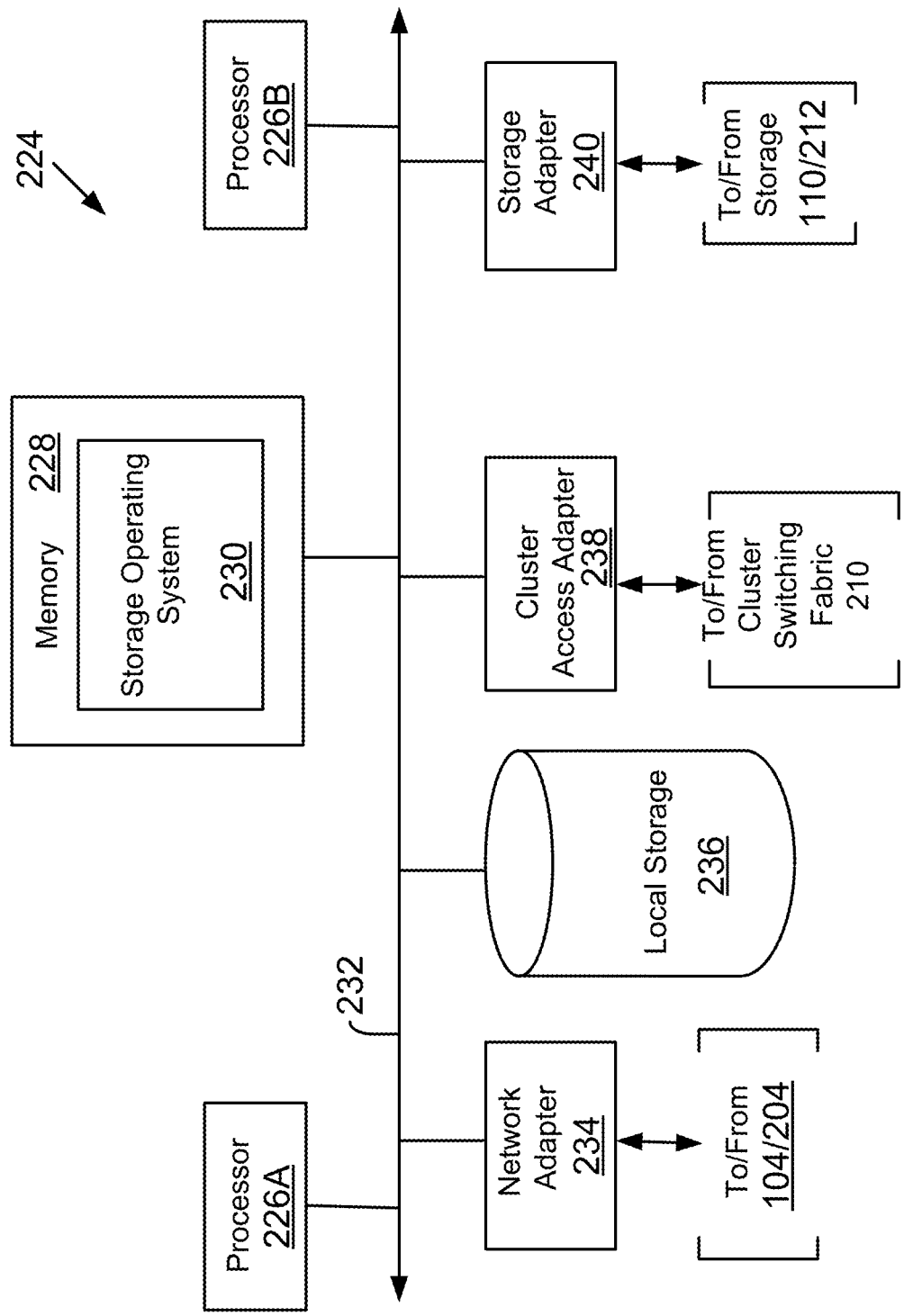
FIG. 2B shows an example of a storage system node, used according to one aspect of the present disclosure.

Storage System Node:

FIG. 2B is a block diagram of a computing system 224, according to one aspect. System 224 may be used by a stand-alone storage system 108 and/or a storage system node operating within a cluster based storage system described above with respect to FIG. 2A.

System 224 may include a plurality of processors 226A and 226B, a memory 228, a network adapter 234, a cluster access adapter 238 (used for a cluster environment), a storage adapter 240 and local storage 236 interconnected by a system bus 232. The local storage 236 comprises one or more storage devices, such as disks, utilized by the processors to locally store configuration and other information, including performance data that is provided to the management system 118.

The cluster access adapter 238 comprises a plurality of ports adapted to couple system 224 to other nodes of a cluster as described above with respect to FIG. 2A. In the illustrative aspect, Ethernet may be used as the clustering protocol and interconnect media, although it will be apparent to those skilled in the art that other types of protocols and interconnects may be utilized within the cluster architecture described herein.

System 224 is illustratively embodied as a dual processor storage system executing a storage operating system 230 that preferably implements a high-level module, such as a file system, to logically organize information as a hierarchical structure of named directories, files and special types of files called virtual disks (hereinafter generally "blocks") on storage devices 110/212. However, it will be apparent to those of ordinary skill in the art that the system 224 may alternatively comprise a single or more than two processor systems. Illustratively, one processor 226 executes the functions of a network module on a node, while the other processor 226B executes the functions of a storage module.

The memory 228 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions described herein.

The storage operating system 230, portions of which is typically resident in memory and executed by the processing elements, functionally organizes the system 224 by, inter alia, invoking storage operations in support of the storage service provided by storage system 108. An example of operating system 230 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 234 comprises a plurality of ports adapted to couple the system 224 to one or more server systems over point-to-point links, wide area networks, virtual private networks implemented over a public network (Internet) or a shared local area network. The network adapter 234 thus may comprise the mechanical, electrical and signaling circuitry needed to connect storage system 108 to the network. Illustratively, the computer network may be embodied as an Ethernet network or a FC network.

The storage adapter 240 cooperates with the storage operating system 230 executing on the system 224 to access information requested by the server systems 104 and management system 118 (FIG. 1A). The information may be stored on any type of attached array of writable storage device media such as video tape, optical, DVD, magnetic tape, bubble memory, electronic random access memory, flash memory devices, micro-electro mechanical and any other similar media adapted to store information, including data and parity information.

The storage adapter 240 comprises a plurality of ports having input/output (I/O) interface circuitry that couples to the disks over an I/O interconnect arrangement, such as a conventional high-performance, FC link topology.

In another aspect, instead of using a separate network and storage adapter, a converged adapter is used to process both network and storage traffic.

Figure 3A:
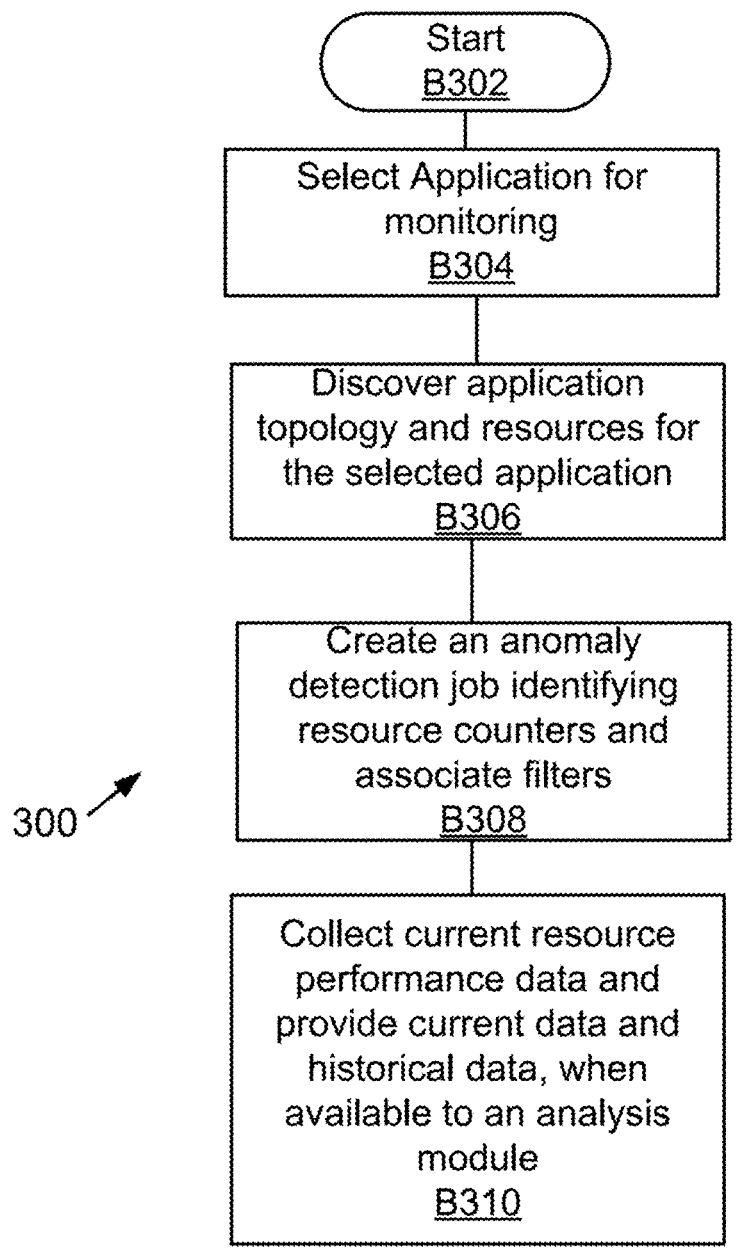
FIG. 3A shows an example of configuring a monitoring job for anomaly detection, according to one aspect of the present disclosure.

Process Flows:

FIG. 3A shows a process for configuring an application for monitoring resources, according to one aspect of the present disclosure. The application may be an entire VM or a processor executable application 106, for example, a database application, an email server application or any other application that is using the resources of the networked storage environment of FIG. 1A/2A. The process begins in block B302, when a user interface is displayed on a display device of a host computing system. The display may be presented by the GUI module 136 of the management system 118, described above in detail.

In block B304, the user selects an application for monitoring. The user may assign a priority for the application and add annotations. Once the application is selected, in block B306, the management system 118, automatically discovers an application topology. The topology may be discovered by a discovery module of the data acquisition module 144. The topology discovers the various resources that may be used by the application, for example, the compute resources of the host system, the storage node resources (network module, storage module), internal volumes that are maintained by a storage operating system and storage pools that are available to the application.

In block B308, an anomaly detection job (or a monitoring job) 143 (FIG. 1B) is created by the job manager 141. The job attributes may be stored as a job object, for example, a JSON (Java Script Object Notation) object. The anomaly detection job 143 identifies the resources that are to be monitored, the counters that have to tracked, filters associated with the counters. As an example, the following table shows an example of the various counters that are used to track performance of various resources. The counters may be filtered, as shown by the filter column. The filter varies based on the resource type.

| Counter | Resource | Filter | Unit |
|---|---|---|---|
| CPU Utilization-Total | Hypervisor | 20 | % |
| BB_Credit_Zero-Total | Edge Port | 200,000 | Integer |
| Utilization-Total | Storage Pool, Storage Node, VM, Internal Volume | 20 | % |
| Latency-Total | Volume, Storage Node | 5 | ms |
| IOPS-Total | VM, Hypervisor, Storage Node, Storage Pool, Volume, Internal Volume | 100 | Integer |

As an example, the CPU utilization by a hypervisor is tracked and filtered by a percentage (e.g. 20, as shown above). A Fibre Channel port typically needs credit to transmit frames. The credit is tracked by a buffer to buffer credit counter (BB credit) that counts when the BB (buffer to buffer) credit runs out i.e. becomes zero and is filtered by an integer value (for example, 200,000). The utilization of a storage pool, storage node is tracked as percentage. The latency of VM, internal volume, storage node, and volume may be tracked in milliseconds. The IOPS are tracked for a VM, hypervisor, storage node, storage pool, volume and internal volumes.

In one aspect, different filters are assigned to the anomaly detection job object 143. For example, certain counter values are ignored when they are below a certain threshold. Furthermore, counter values for dormant resources are ignored. For example, if a volume has less than 100 IOPS at certain time, then the latency spike due to the low IOPS may be ignored because the spike may be caused by an internal process that may have no impact on the application. The following provides an example of an annotated JSON job object configuration:

```
        Job Configuration
        {
"id": "application_1315819", --Application unique ID
"analysisConfig": {
"bucketSpan": 1800,      --30 minutes buckets [duration for
collecting data]
//Filter 1: Excluding Anomalies Below the Threshold
"byFieldValueThresholds": {
"latency.total": 15,
"diskLatency.total": 15
"cpuUtilization.total": 20,
"bbCreditZero.total": 200000,
"diskIops.total": 100,
"iops.total": 100,
"utilization.total": 20
},
//Filter 2: Excluding Anomalies for Dormant Resources
"resultByFieldValueThresholds": {
"diskIops.total": 100,
"iops.total": 100
}
"latency": 900, --Delay to ensure that all the data is
collected for that bucket (or interval)
"detectors": [
{
"function": "mean", -- using averages for the data in the
bucket (multiple values/polls in 30 minutes)
"fieldName": "metricValue", -- counter value
"byFieldName": "metricName", -- counter name
"partitionFieldName": "id" - roll-up by resource unique ID
}
```

Once the anomaly detection job is created, the performance monitoring module 140 filters the performance data 150 and presents it to the data analysis module 139. The data analysis module 139 is also provided with any historical performance data for the resource. The analysis module 139 then analyzes the collected data and provides an anomaly score for the entire application infrastructure and each resource, as described below with respect to FIG. 3B.

Figure 3B:
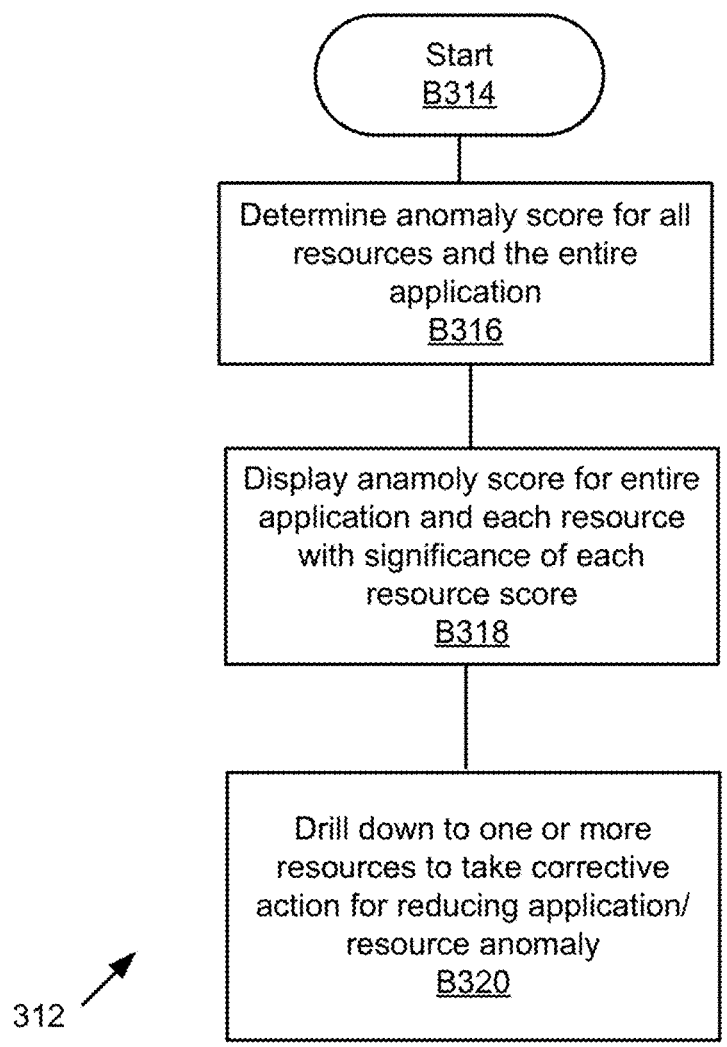
FIG. 3B shows an example of a process for providing anomaly information to a user, according to one aspect of the present disclosure.

FIG. 3B shows a process 312 for analyzing the performance data for the job that is created by the process of FIG. 3A, according to one aspect. The process begins in block B314, when current performance data and historical performance data for the resources used by the application have been received by the analysis module 139. In context of the job configuration above, following is an example of the performance data that is sent to the data analysis module 139:

```
    {
    "metricName":"latency.total",
    "metricValue":45.0,
    "id":"InternalVolume_1041",
    "timestamp":1449670249338
    }
    {
    "metricName":"iops.total",
    "metricValue":56.0,"id":
    "InternalVolume_1041",
    "timestamp":1449670249338
    }
```

In block B316, the data analysis module 139 determines an overall anomaly score for the application and individual anomaly scores for each resource that is used and monitored on behalf of the application. The anomaly score is indicative of observations that do not conform to an expected pattern or other performance data counter values for various resources. The analysis module 139 looks at trend lines, time dependent ranges (for example, weekday compared weekend data), correlation between values that are close in time. The adaptive aspects described herein are not limited to any one analytical technique. The anomaly score is generated automatically and is part of a machine learning process. In one aspect, the analysis module 139 determines deviations in the performance data, evaluates rare events and if the behavior of the performance data is unusual compared to peer resources. In one aspect, the analysis module 139 provides the anomaly score for the entire application and also highlights the significant resource anomaly scores. The significance may be based on threshold values, as described below.

In one aspect, the analysis module 139 takes actual probability values and normalizes the values to a human readable score, for example, between 0-100. A low score may be 0-50, a medium score may be 51-75 and a high score maybe 76-100. The high score denotes a higher anomaly value.

Continuing with the foregoing job configuration example, the following provides an example of the anomaly score:

```
    {
    "timestamp" : "2016-02-07T10:00:00.000+0000",
    "partitionFieldValue" : "StoragePool_788676",
    "typical" : 0.207159,   -- the expected value for this
timeframe
    "normalizedProbability" : 99.9999, -human readable
anomaly score for the individual resource
```

-continued

```
"probability" : 2.22507E-308,
"byFieldValue" : "iops.total",
"anomalyScore" : 99.9711,  -human readable anomaly
   score for the entire application
    "actual": 8092.14 -the current value}
```

In block B318, the anomaly score is displayed at a display device. The display provides the overall score and the score of each resource. The significance of each resource score is also provided.

Based on the display, a user in block B320, can drill down to individual resources and ascertain the root cause behind the anomaly for the application. Depending on the resource type and the reason behind the anomaly, a corrective action can be taken to fix the anomalous behavior.

FIGS. 3C-3I show examples of various GUI shots for automatic anomaly detection described above with respect to FIGS. 3A-3B.

Figure 3C:
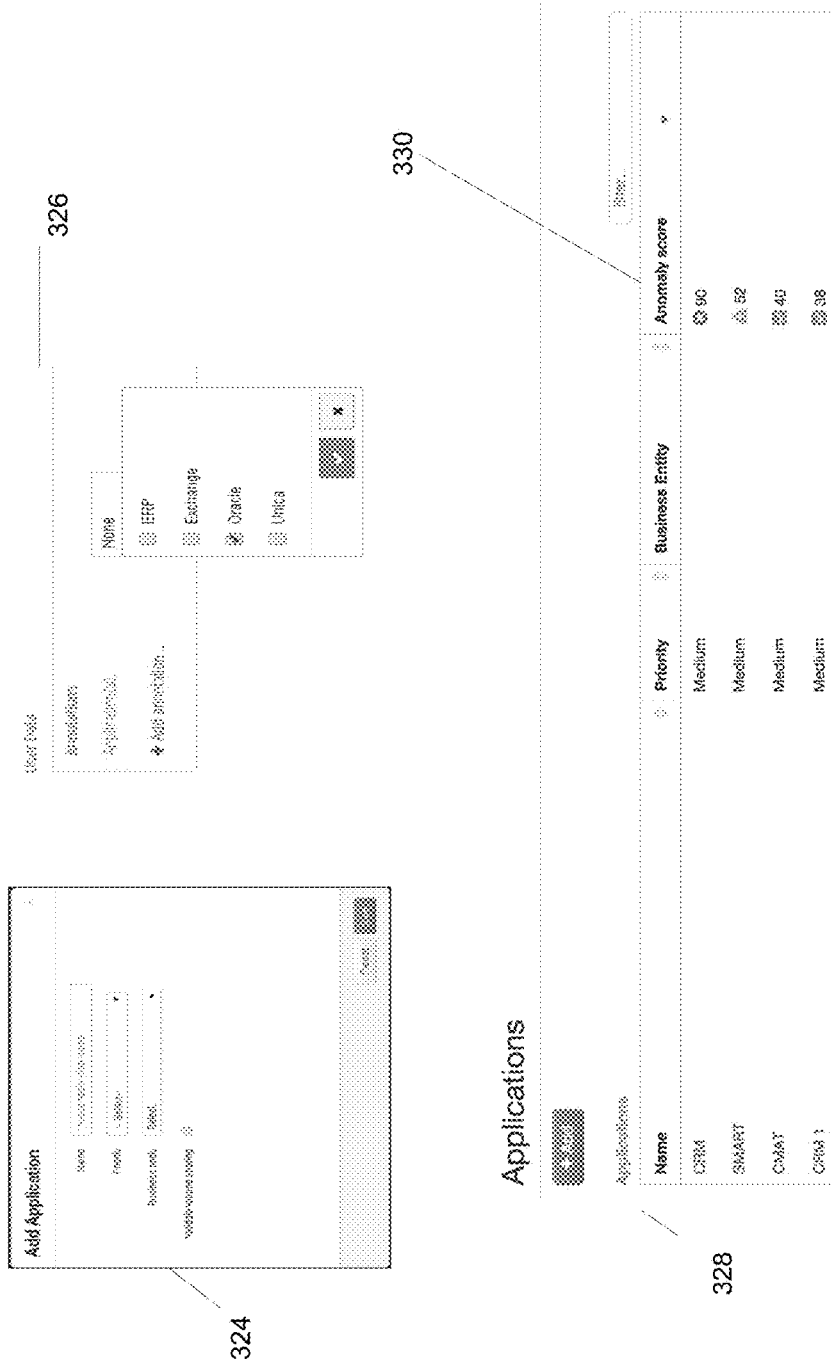

FIG. 3C shows a screenshot 324 that is displayed on a display device. Screenshot 324 enables a user to specify an application that it wants to monitor, a priority of the application and specify a business entity that may be associated with the application. Screenshot 326 enables the user to add an annotations to the application monitoring.

Screenshot 328 shows a table layout with a plurality of monitored host applications, for example, CRM, SMART, CMAT, CRM 1 mentioned under the Name column. The priority for each application is shown in the priority column and the anomaly score for each application is shown under the anomaly score column 330. The anomaly score is updated dynamically as more data is collected. The display of 328 may be filtered using the filter tab. Screen shot 328 enables a user to add the application by selecting the +Add tab that displays screenshot 324, described above.

Figure 3D:
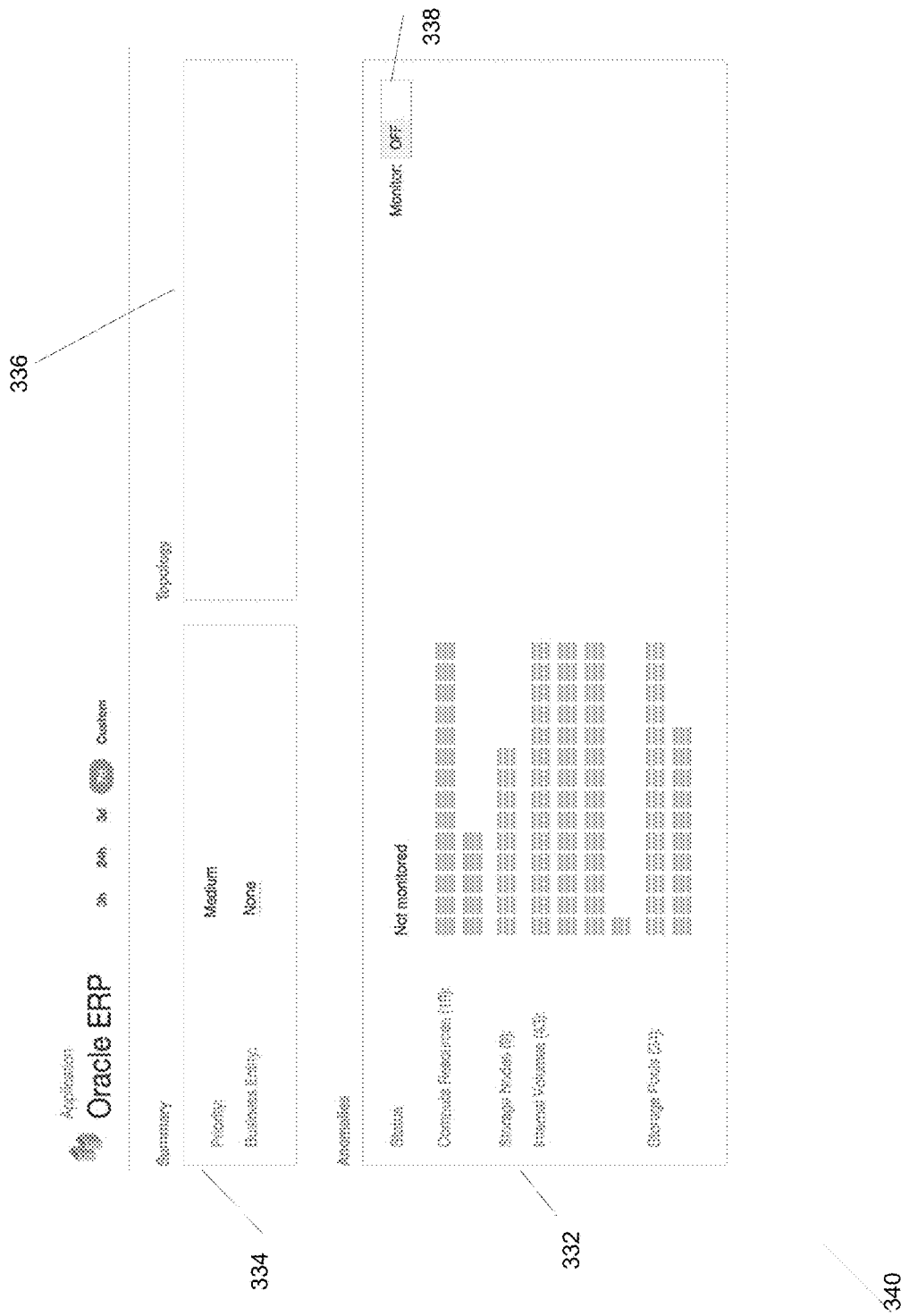

FIG. 3D shows an example of a screenshot 340 for an application that is not monitored (as shown by indicator 338 ("off"). Screen shot 340 has a plurality of segments, for example, a summary segment 334 and an anomalies display segment 332. Since the application in FIG. 3D is not monitored, segment 332 does not highlight individual resource anomalies.

Figure 3E:
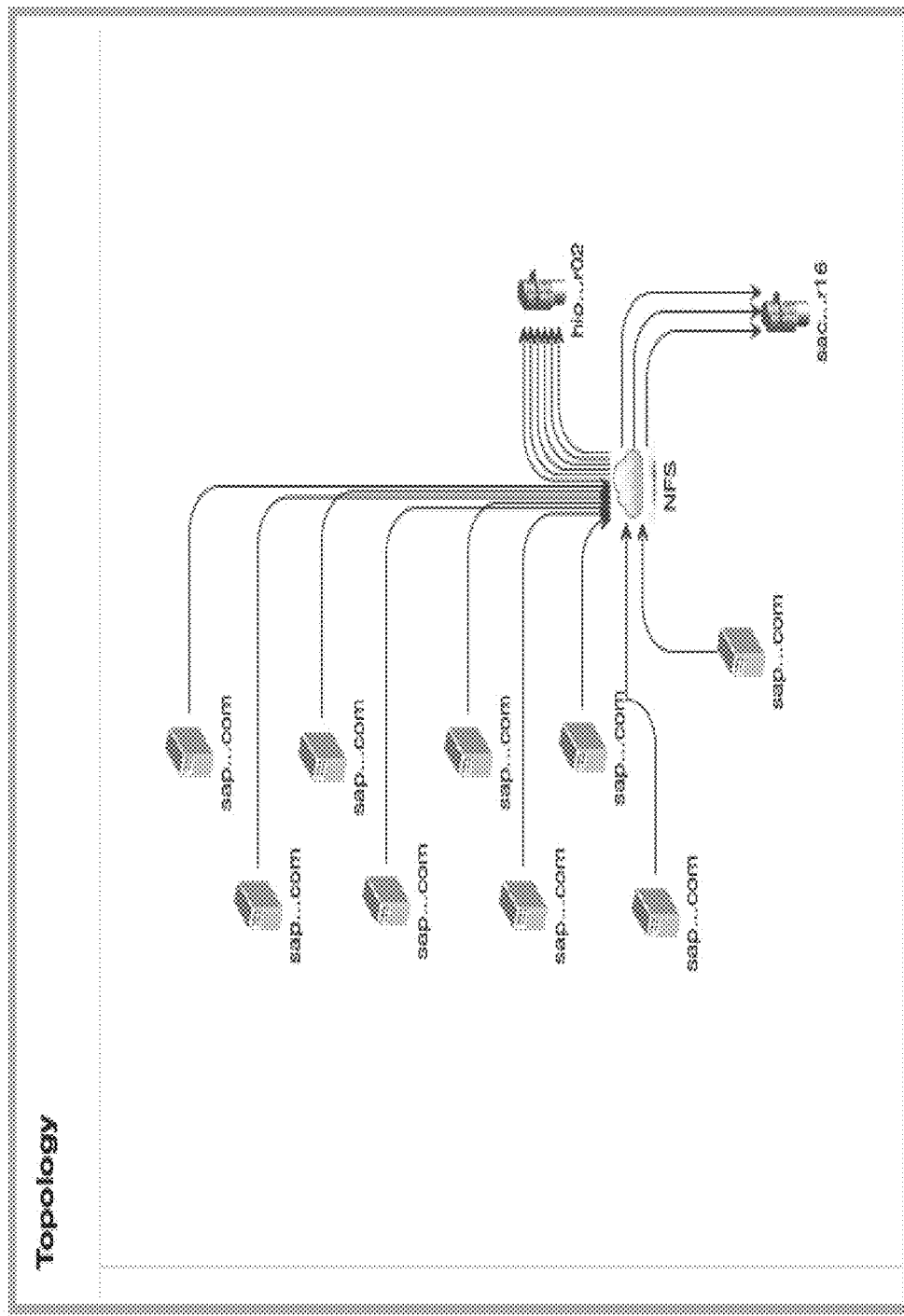

Screen shot 340 also includes a topology segment 336 that enables a user to see the topology of various resources that are used by the application, "Oracle ERP" mentioned on the top left corner of the screen shot 340. FIG. 3E shows an example of the topology 336. With various sap.com servers and the data centers hio.r02 and sac.r16. The topology varies based on the application type and the resource type.

Figure 3F:
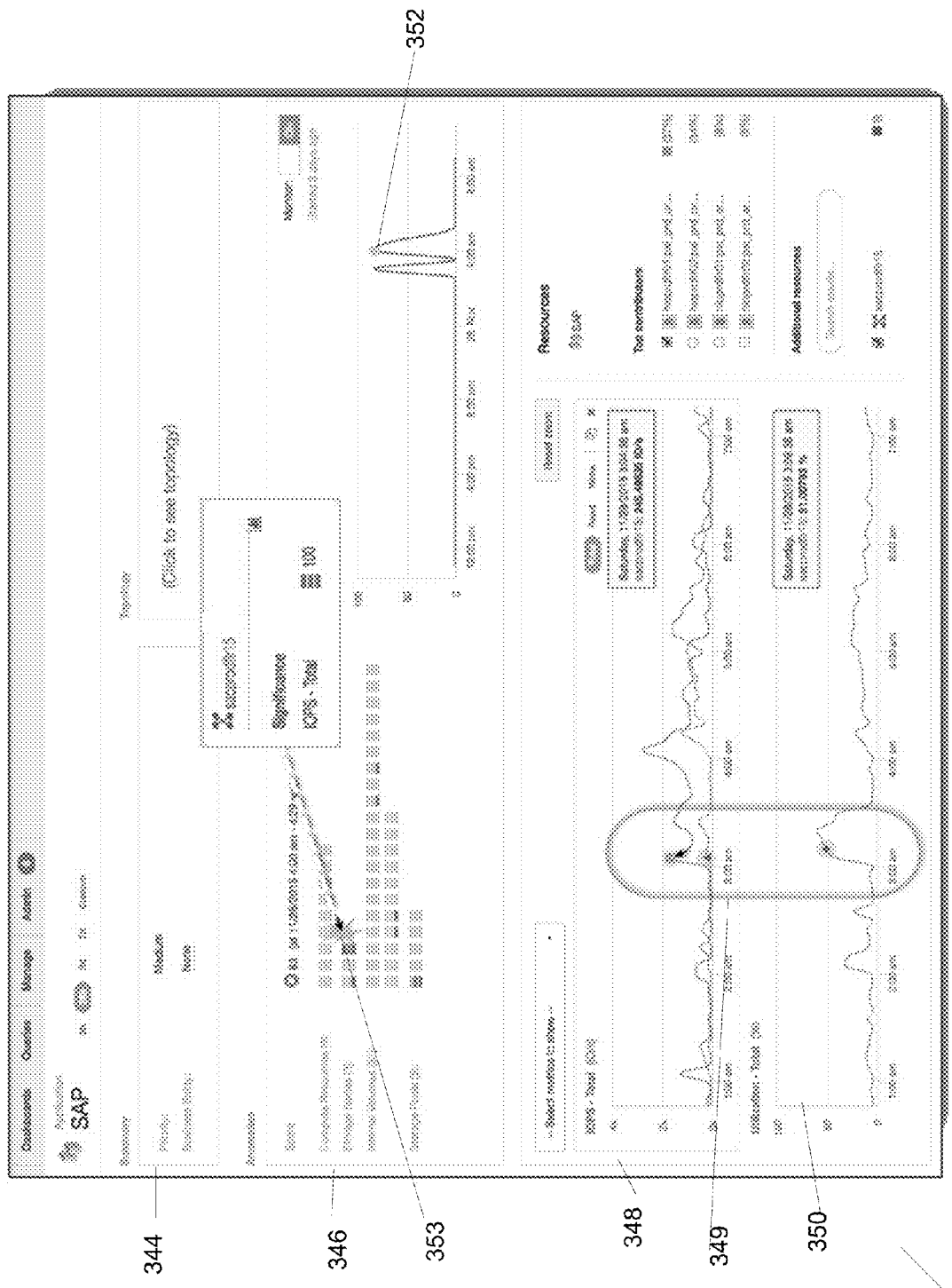

FIG. 3F shows a screenshot 341 with a comprehensive view of a monitored application, shown as SAP on the top left hand corner of the screen. Similar to FIG. 3D, screen shot 341 has various segments, for example, a summary segment 344, an anomalies segment 346, segments 348 and 350 that show variation of different metrics over time. The anomalies segment 346 show the anomaly score of each resource and a graph 352 that shows the anomaly score variation over time. The top of the graph shows the highest anomaly. The user is also able to see the anomaly of each resource over time. The storage node identified by numeral 353 has the highest anomaly. By clicking at the graphing symbol, the performance data of the resource "sacprdflr15" is shown in segments 348 and 350. For example, segment 348 shows the IOPS over time and segment 350 shows utilization. Segment 349 shows when the sacflr15 had the highest anomaly overtime. This enables the user to take corrective action with respect to the resource, for example, to move workloads to another storage, re-size a volume or any other action, depending on the resource.

Figure 3G:
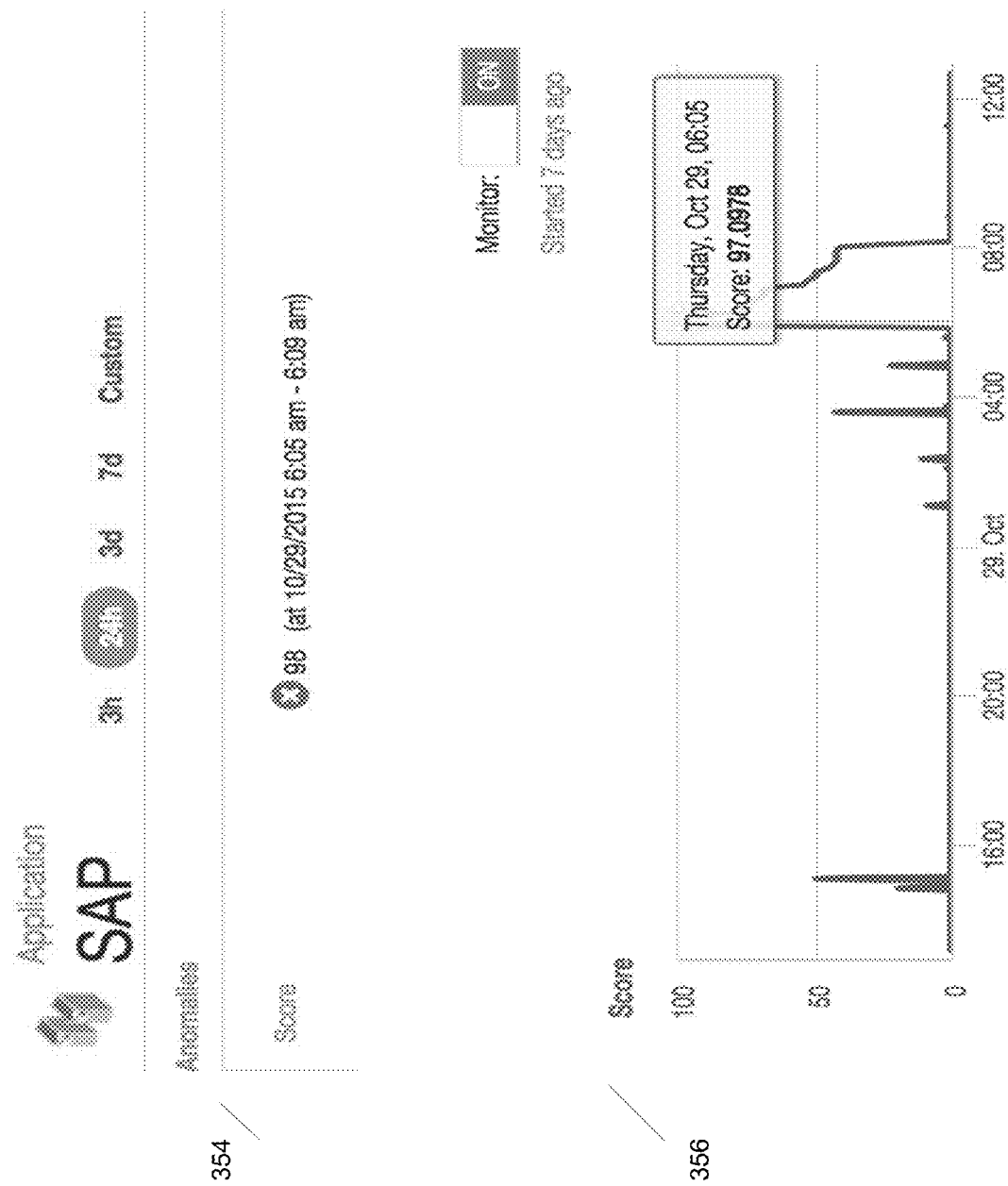
Figure 3I:
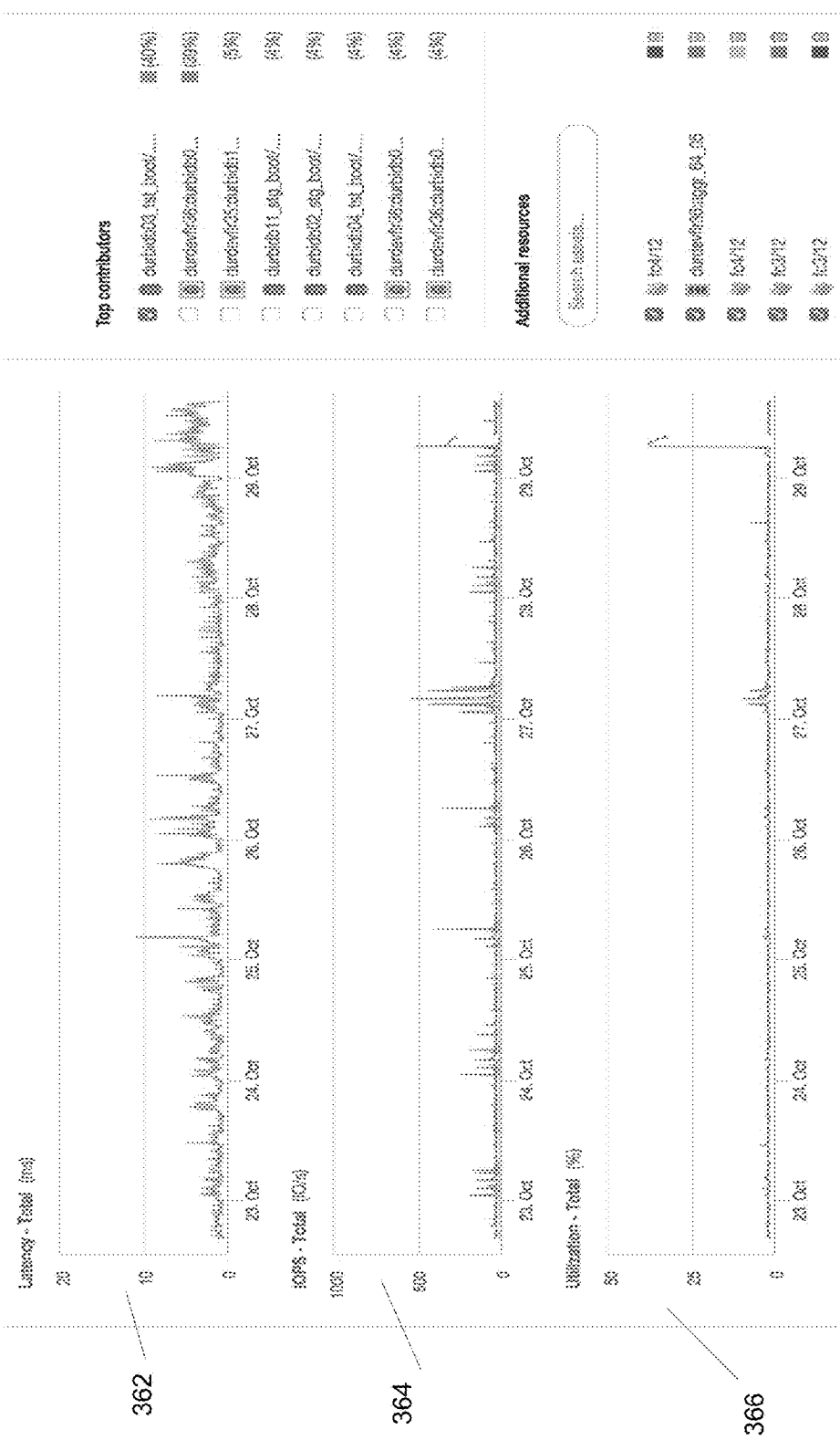
Figure 3J:
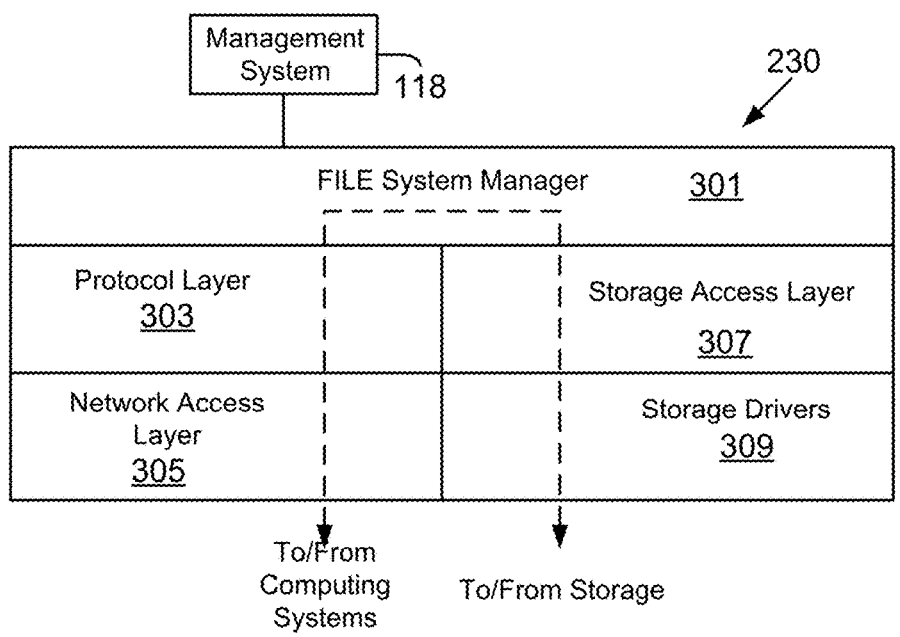
FIG. 3J shows an example of a storage operating system, used according to one aspect of the present disclosure.

FIGS. 3G-3I show details of the screenshot 341, as an example. FIG. 3G shows the anomaly score for the application in the last 24 hours as 98 in segment 354. The anomaly score variation is shown in segment 356 as a graph, where on October 29 at 6.05, the score was 97.0978.

FIG. 3H shows the anomalies segment 358 for the application of FIG. 3G. The user is presented with the anomaly score of all the resources at October 29 at 6.05 am. One of the storage pools is identified as the resource with the highest anomaly in segment 360. The resource is identified within segment 360 and by clicking on icon 361, the user is provided with details shown in FIG. 3I.

In FIG. 3I, segment 362 shows a latency curve for the resource, segment 364 shows an IOPS curve and segment 366 shows a utilization curve. These curves are all based over time. The user can drill down and see what may be causing the anomaly and then correct the anomaly by appropriate corrective action. FIG. 3I also shows the top contributors to the latency, IOPS and utilization of the resource. A user is able to add additional resources and compare them with the graphed resource.

The process and systems described above have various advantages. For important applications in a networked environment, instead of using static threshold values, anomaly detection may be enabled for monitoring and detecting any significant change in the application infrastructure behavior. The system efficiently tracks an entire resource stack using a plurality of counters. Aberrant behavior is detected and can be corrected efficiently. Since anomaly detection is machine learning based, the process automatic and requires minimal user intervention.

Operating System:

FIG. 3F illustrates a generic example of operating system 230 executed by storage system 108, according to one aspect of the present disclosure. Storage operating system 230 interfaces with the management system 118 and provides information for the various data structures maintained by the management system 118, described above in detail.

As an example, operating system 230 may include several modules, or "layers". These layers include a file system manager 303 that keeps track of a directory structure (hierarchy) of the data stored in storage devices and manages read/write operations, i.e. executes read/write operations on disks in response to server system 104 requests.

Operating system 230 may also include a protocol layer 303 and an associated network access layer 305, to allow system 200 to communicate over a network with other systems, such as server system 104 and management system 118. Protocol layer 303 may implement one or more of various higher-level network protocols, such as NFS, CIFS, Hypertext Transfer Protocol (HTTP), TCP/IP and others, as described below.

Network access layer 305 may include one or more drivers, which implement one or more lower-level protocols to communicate over the network, such as Ethernet. Interactions between server systems 104 and mass storage devices 110/114/212 are illustrated schematically as a path, which illustrates the flow of data through operating system 230.

The operating system 230 may also include a storage access layer 307 and an associated storage driver layer 309 to communicate with a storage device. The storage access layer 307 may implement a higher-level disk storage protocol, such as RAID (redundant array of inexpensive disks), while the storage driver layer 309 may implement a lower-level storage device access protocol, such as FC or SCSI.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 108.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

Figure 4:
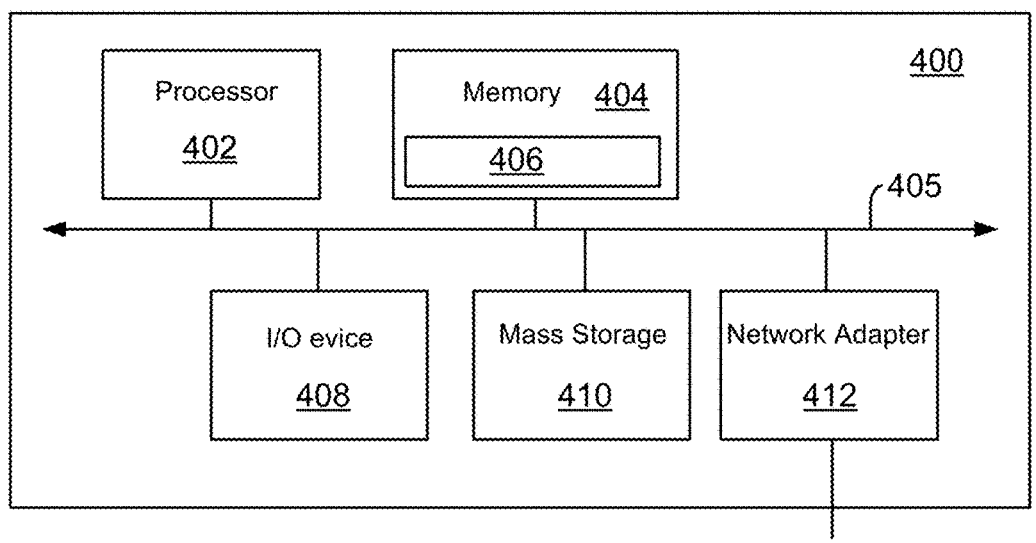
FIG. 4 shows an example of a processing system, used according to one aspect of the present disclosure.

Processing System:

FIG. 4 is a high-level block diagram showing an example of the architecture of a processing system, at a high level, in which executable instructions as described above can be implemented. The processing system 400 can represent modules of management system 118, user console 102, server systems 104 and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code used by performance module 140, acquisition module 144, configuration module 142, GUI 136 as well as instructions for executing the process blocks of FIGS. 3A and 3B.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The management system 118 (and associated methods thereof) and storage systems described above can be a part of the server layer for providing storage services. Details regarding these layers are not germane to the inventive aspects.

Thus, a method and apparatus for managing resources within system 100 have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:

discovering an application topology by a processor, the application topology indicating a plurality of resources and relationships between the resources used by an application in a networked storage system having at least a storage node, a network resource and a plurality of storage devices for storing and retrieving data;

generating by the processor, a job object for anomaly detection in the discovered topology, the job object using a same format for different application types, the job object identifying the resources of the application topology, counters associated with the resources to track resource performance, and filtering options for filtering counter data indicating resource performance;

wherein the job object identifies a first data type that is ignored for anomaly detection when a value for the first data type is below a threshold, and a second data type whose value is ignored when a resource associated with the second data type has been dormant for a certain duration; and using the job object and resource performance data for automatically determining by the processor, an overall anomaly score for the application topology indicating application behavior over time and individual anomaly score for each resource with an indicator highlighting each resource's impact on the overall anomaly score;

wherein the overall anomaly score and individual anomaly scores are used to identify a root cause for an application anomaly and initiate corrective action to correct the anomaly.

2. The method of claim 1, wherein the application is a virtual machine executed by the computing device.

3. The method of claim 1, wherein the processor executes a management application that monitors a counter for each of the plurality of resources for tracking performance of the plurality of resources.

4. The method of claim 3, wherein the management application provides a display with the overall anomaly score and individual anomaly scores of each resource identifying when a particular anomaly score for a resource was beyond an acceptable range.

5. The method of claim 4, wherein the display provides selectable options enabling a user to view detailed performance data for a resource with performance data beyond an acceptable range.

6. The method of claim 3, wherein the management application provides a user interface for selecting the application for resource monitoring and deselecting the application for resource monitoring.

7. The method of claim 1, wherein performance data includes a number of input/output operations that have been processed, a latency in processing operations and utilization of the plurality of resources.

8. A non-transitory, machine-readable storage medium having stored thereon instructions for performing a method, comprising machine executable code which when executed by at least one machine, causes the machine to:

discover an application topology by a processor, the application topology indicating a plurality of resources and relationships between the resources used by an application in a networked storage system having at least a storage node, a network resource and a plurality of storage devices for storing and retrieving data;

generate by the processor, a job object for anomaly detection in the discovered topology, the job object using a same format for different application types, the job object identifying the resources of the application topology, counters associated with the resources to track resource performance, and filtering options for filtering counter data indicating resource performance;

wherein the job object identifies a first data type that is ignored for anomaly detection when a value for the first data type is below a threshold, and a second data type whose value is ignored when a resource associated with the second data type has been dormant for a certain duration; and use the job object and resource performance data for automatically determining by the processor, an overall anomaly score for the application topology indicating application behavior over time and individual anomaly score for each resource with an indicator highlighting each resource's impact on the overall anomaly score;

wherein the overall anomaly score and individual anomaly scores are used to identify a root cause for an application anomaly and initiate corrective action to correct the anomaly.

9. The non-transitory, storage medium of claim 8, wherein the application is a virtual machine executed by the computing device.

10. The non-transitory, storage medium of claim 8, wherein the processor executes a management application that monitors a counter for each of the plurality of resources for tracking performance of the plurality of resources.

11. The non-transitory, storage medium of claim 10, wherein the management application provides a display with the overall anomaly score and individual anomaly scores of each resource identifying when a particular anomaly score for a resource was beyond an acceptable range.

12. The non-transitory, storage medium of claim 11, wherein the display provides selectable options enabling a user to view detailed performance data for a resource with performance data beyond an acceptable range.

13. The non-transitory, storage medium of claim 10, wherein the management application provides a user interface for selecting the application for resource monitoring and deselecting the application for resource monitoring.

14. The non-transitory, storage medium of claim 8, wherein performance data includes a number of input/output operations that have been processed, a latency in processing operations and utilization of the plurality of resources.

15. A system, comprising:

a memory containing machine readable medium comprising machine executable code having stored thereon instructions; and a processor module of a management console coupled to the memory, the processor module configured to execute the machine executable code to:

discover an application topology indicating a plurality of resources and relationships between the resources used by an application in a networked storage system having at least a storage node, a network resource and a plurality of storage devices for storing and retrieving data;

generate by the processor, a job object for anomaly detection in the discovered topology, the job object using a same format for different application types, the job object identifying the resources of the application topology, counters associated with the resources to track resource performance, and filtering options for filtering counter data indicating resource performance;
wherein the job object identifies a first data type that is ignored for anomaly detection when a value for the first data type is below a threshold, and a second data type whose value is ignored when a resource associated with the second data type has been dormant for a certain duration; and
use the job object and resource performance data for automatically determining by the processor, an overall anomaly score for the application topology indicating application behavior over time and individual anomaly score for each resource with an indicator highlighting each resource's impact on the overall anomaly score;
wherein the overall anomaly score and individual anomaly scores are used to identify a root cause for an application anomaly and initiate corrective action to correct the anomaly.

16. The system of claim 15, wherein the application is a virtual machine executed by the computing device.

17. The system of claim 15, wherein the processor module executes a management application that monitors a counter for each of the plurality of resources for tracking performance of the plurality of resources.

18. The system of claim 17, wherein the management application provides a display with the overall anomaly score and individual anomaly scores of each resource identifying when a particular anomaly score for a resource was beyond an acceptable range.

19. The system of claim 18, wherein the display provides selectable options enabling a user to view detailed performance data for a resource with performance data beyond an acceptable range.

20. The system of claim 17, wherein the management application provides a user interface for selecting the application for resource monitoring and deselecting the application for resource monitoring.

* * * * *